United States Patent [19]

Brown et al.

[11] Patent Number: 6,009,860
[45] Date of Patent: Jan. 4, 2000

[54] METHOD FOR RESPONDING TO DETECTION OF AN OPEN FAULT CONDITION IN A GASEOUS FUEL ADMISSION VALVE OF AN ENGINE

[75] Inventors: Scott C. Brown, Peoria, Ill.; Martin L. Willi, Lafayette, Ind.

[73] Assignee: Caterpillar Inc., Peoria, Ill.

[21] Appl. No.: 09/038,582

[22] Filed: Mar. 11, 1998

[51] Int. Cl.⁷ ..................................................... F02B 43/00
[52] U.S. Cl. .................. 123/529; 123/525; 123/198 DB
[58] Field of Search .................................... 123/525, 526, 123/527, 529, 479, 198 DB

[56] References Cited

U.S. PATENT DOCUMENTS

| | | | |
|---|---|---|---|
| 4,335,697 | 6/1982 | McLean | 123/527 |
| 4,463,734 | 8/1984 | Akeroyd | 123/525 |
| 4,597,364 | 7/1986 | Young | 123/27 GE |
| 4,641,625 | 2/1987 | Smith | 123/575 |
| 4,721,078 | 1/1988 | Watanabe et al. | 123/198 DB |
| 4,817,568 | 4/1989 | Bedford | 123/431 |
| 4,955,326 | 9/1990 | Helmich | 123/27 GE |
| 5,136,986 | 8/1992 | Jensen | 123/27 GE |
| 5,140,959 | 8/1992 | Durbin | 123/304 |
| 5,150,685 | 9/1992 | Porter et al. | 123/478 |
| 5,224,457 | 7/1993 | Arsenault et al. | 123/526 |
| 5,226,396 | 7/1993 | Bailey | 123/494 |
| 5,370,097 | 12/1994 | Davis | 123/526 |
| 5,398,724 | 3/1995 | Vars et al. | 137/625.33 |
| 5,450,829 | 9/1995 | Beck | 123/435 |
| 5,526,786 | 6/1996 | Beck et al. | 123/357 |
| 5,611,316 | 3/1997 | Oshima et al. | 123/494 |
| 5,690,078 | 11/1997 | Ofner | 123/529 |
| 5,711,270 | 1/1998 | Pedersen | 123/304 |
| 5,755,210 | 5/1998 | Sato et al. | 123/518 |

*Primary Examiner*—Noah P. Kamen
*Assistant Examiner*—Hai Huynh
*Attorney, Agent, or Firm*—Haverstock, Garrett & Roberts

[57] ABSTRACT

A method for responding to detection of an open fault condition in a gaseous fuel admission valve for providing a flow of gaseous fuel to an affected combustion cylinder of an engine, the engine including at least one other gaseous fuel admission valve for providing a flow of gaseous fuel to at least one other combustion cylinder, a gaseous fuel shut off valve for controlling gaseous fuel flow from a source of gaseous fuel to a gaseous fuel manifold in communication with the gaseous fuel admission valve, and apparatus for causing ignition of a mixture of the gaseous fuel and air in each combustion cylinder. The present method involves the steps of closing the gaseous fuel shut off valve; disabling the ignition of the mixture of gaseous fuel and air in the affected combustion cylinder; and continuing operation of the at least one other gaseous fuel admission valve to allow flow of remaining gaseous fuel in the gaseous fuel manifold through the at least one other gaseous fuel admission valve into the at least one other combustion cylinder of the engine where the gaseous fuel can be combusted. In the instance of an engine operating in a dual fuel mode, at a suitable point, operation can be shifted to a liquid fuel mode. In the instance of an engine that operates solely on gaseous fuel, once the gaseous fuel remaining in the gaseous fuel manifold is exhausted, the engine will come to rest.

16 Claims, 3 Drawing Sheets

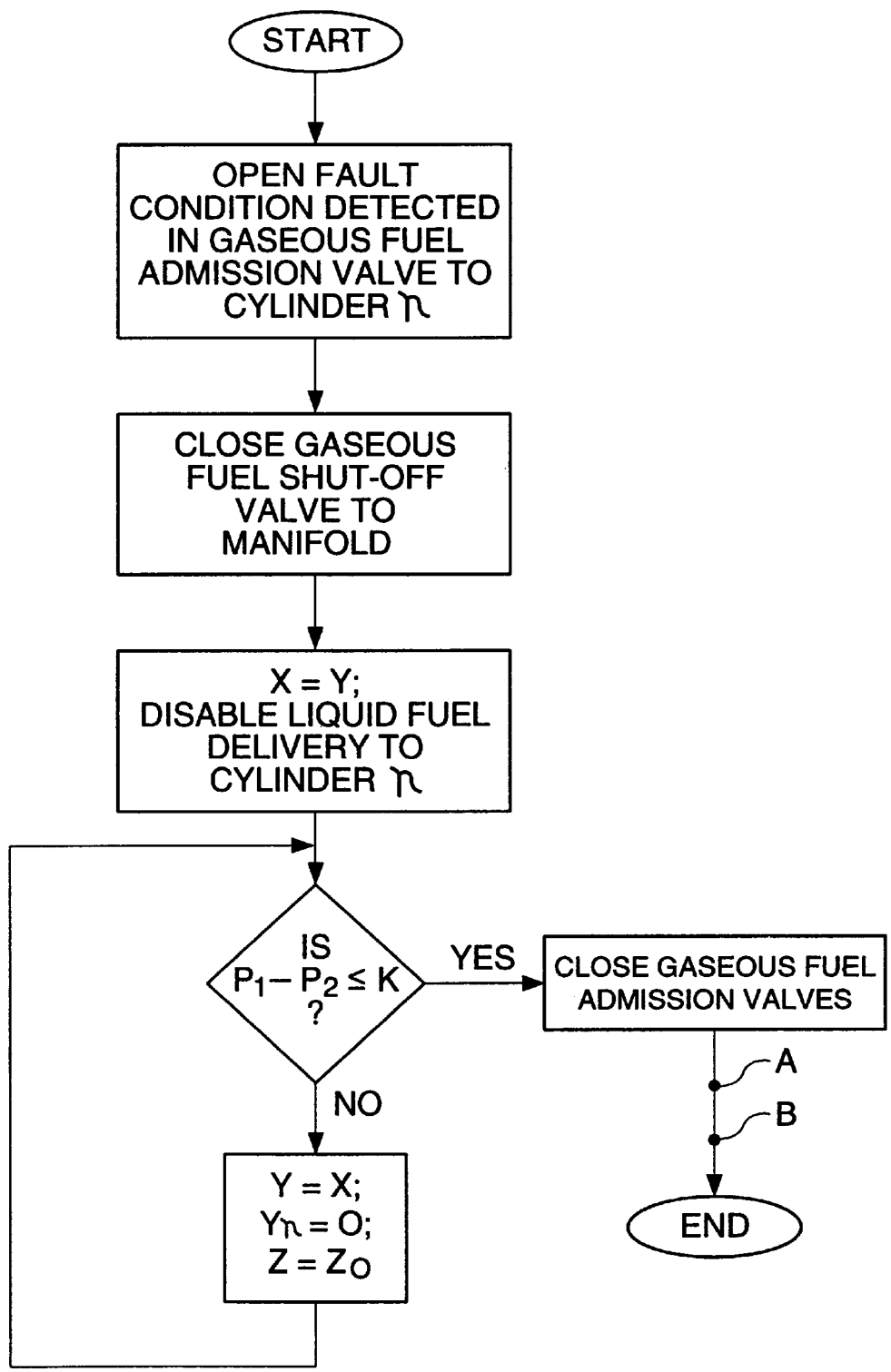

METHOD FOR RESPONDING TO DETECTION OF AN OPEN FAULT CONDITION IN A GASEOUS FUEL ADMISSION VALVE OF AN ENGINE

TECHNICAL FIELD

This invention relates generally to internal combustion engines that utilize gaseous fuel as a sole or partial source of energy for combustion, and more particularly, to a method for responding to detection of an open fault condition in gaseous fuel admission valves of such engines.

BACKGROUND ART

In internal combustion engines that utilize gaseous fuel as a sole source of energy for combustion, such as spark ignited gaseous fuel engines, and in engines that utilize gaseous fuel in combination with another fuel as the source of energy for combustion, such as dual fuel engines and blended fuel engines, a gaseous fuel admission valve is typically used to control admission of the gaseous fuel from a gaseous fuel manifold into an air inlet passage such as intake port wherein the gaseous fuel mixes with air enroute to a combustion cylinder of the engine. Such gaseous fuel admission valves are typically electronically controlled by an engine control module to open and close at appropriate times to allow admission of a determined quantity of the gaseous fuel into the air inlet passage. In a spark ignited engine, the mixture of gaseous fuel and air is ignited in the combustion chamber by a spark plug. In a dual fuel engine, a determined quantity of diesel fuel is injected into the combustion cylinder and is ignited by compression so as to combust and ignite the mixture of gaseous fuel and air. Reference U.S. Pat. No. 5,398,724, issued Mar. 2, 1995 to Woodward Governor Company, which discloses a representative gaseous fuel admission valve.

A problem that can occur during the operation of gaseous fuel admission valves, is that the valves can become stuck or fixed in an open position, usually caused by a small piece of debris, hereinafter referred to as an open fault condition, thereby allowing a continuous flow of gaseous fuel into the inlet passage. The gaseous fuel can collect in the inlet passage and result in an undesirably high fuel delivery to the affected combustion cylinder associated with the stuck open gaseous fuel admission valve. This can result in a deviation in the expected ratio of gaseous fuel to air in the affected combustion cylinder, thereby causing potentially engine damaging severe detonation conditions in the affected combustion cylinder, which detonation conditions are typically detectable, for instance, by a detonation sensor of the engine.

Accordingly, the present invention is directed to overcoming one or more of the problems as set forth above.

DISCLOSURE OF THE INVENTION

In one aspect of the present invention a method for responding to detection of an open fault condition in a gaseous fuel admission valve for providing a flow of gaseous fuel to an affected combustion cylinder of an engine is disclosed, the engine preferably including at least one other gaseous fuel admission valve for providing a flow of gaseous fuel to at least one other combustion cylinder, a gaseous fuel shut off valve for controlling gaseous fuel flow from a source of gaseous fuel to a gaseous fuel manifold in communication with the gaseous fuel admission valve, and means for igniting a mixture of the gaseous fuel and air in each of the respective combustion cylinders. The present method involves the steps of closing the gaseous fuel shut off valve; disabling the means for igniting the mixture of gaseous fuel and air in the affected combustion cylinder; and continuing operation of the at least one other gaseous fuel admission valve to allow flow of remaining gaseous fuel in the gaseous fuel manifold through the at least one other gaseous fuel admission valve into the at least one other combustion cylinder of the engine where the gaseous fuel can be combusted. In the instance of an engine operating in a dual fuel mode, at a suitable point, operation can be shifted to a liquid fuel mode, and after a predetermined condition is met, such as a predetermined condition involving the pressure level in the gaseous fuel manifold, the means for igniting the mixture of gaseous fuel in the affected combustion cylinder can be re-enabled so as to operate in the same manner as the means for igniting the mixture of gaseous fuel and air in the at least one other combustion cylinder. In the instance of an engine that operates solely on gaseous fuel, once the gaseous fuel remaining in the gaseous fuel manifold is exhausted, the engine will come to rest.

In each instance, disabling the means for igniting the mixture of gaseous fuel and air in the affected combustion cylinder avoids the problem of severe detonation in the affected combustion cylinder, thereby avoiding potentially serious engine damage. Further, according to a preferred aspect of the invention, after an open fault condition is detected in a gaseous fuel admission valve for an affected cylinder, an engine operating in a dual fuel mode is switched to a liquid fuel mode such that the engine speed or other governing parameter affects the delivery of liquid fuel to the engine only, the operation of the gaseous fuel admission valve or valves for the other cylinder or cylinders being operated at a constant rate, so that as the gaseous fuel contribution to combustion in the other cylinder or cylinders begins to drop, the engine governor or other control means will automatically increase the rate of liquid fuel delivery to the other cylinder or cylinders in an attempt to maintain a constant engine speed or other controlling parameter. Then, when the above predetermined condition is met, which is typically a condition wherein the difference between a pressure level in the gaseous fuel manifold and a pressure level at another location such as an air intake manifold is below a predetermined level, liquid fuel injection to the affected cylinder can resume, preferably gradually at an incremental rate.

BRIEF DESCRIPTION OF THE DRAWINGS

For a better understanding of the present invention, reference may be made to the accompanying drawings in which:

FIG. 2 is a flowchart of operating steps for the engine system of FIG. 1 in accordance with one aspect of the present invention;

BEST MODE FOR CARRYING OUT THE INVENTION

Figure 1:
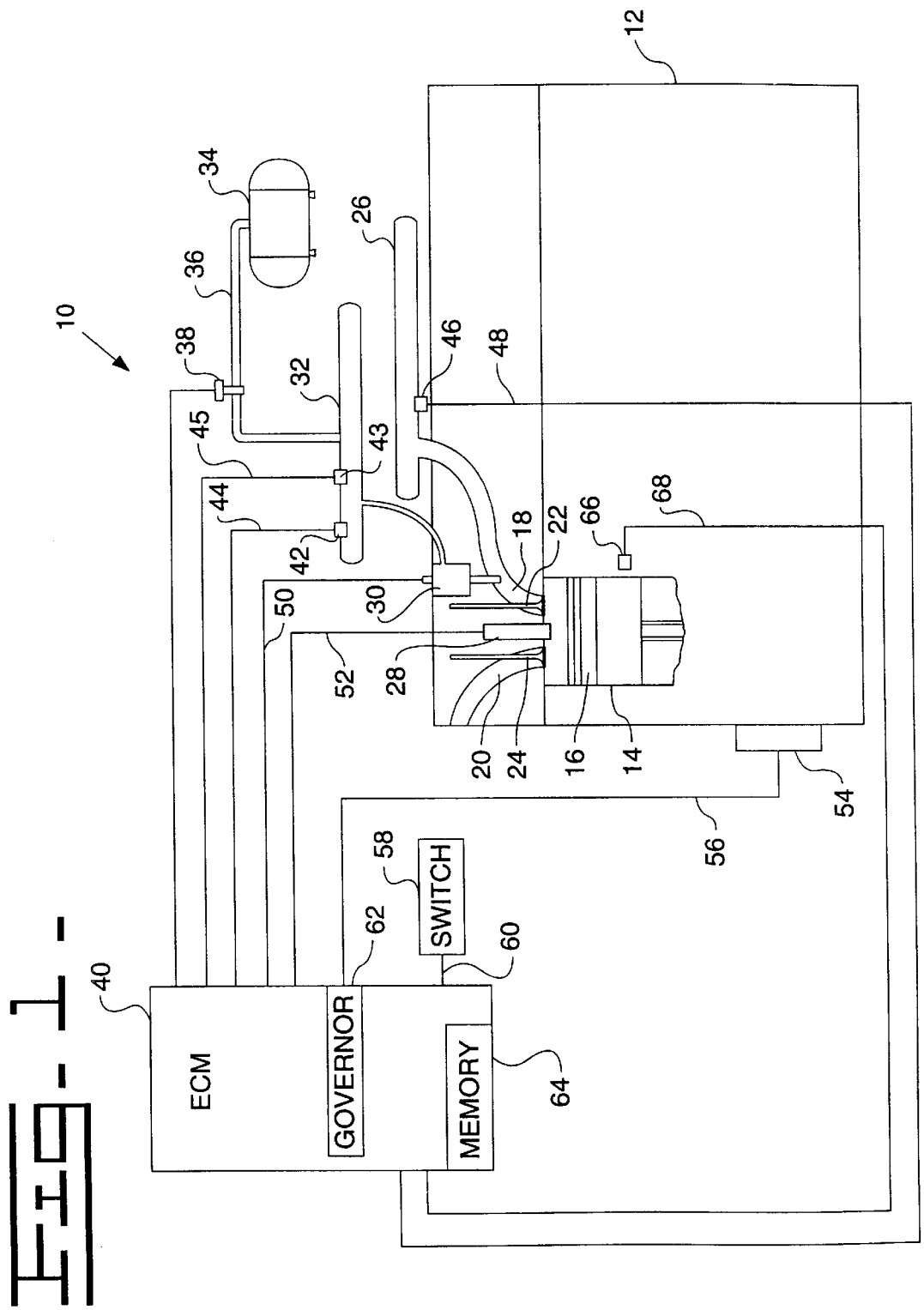
FIG. 1 is a schematic view of an engine system in accordance with the present invention.

Referring to the drawings, numeral 10 in FIG. 1 depicts an engine control system used in association with the present invention, including an internal combustion engine 12 having a representative cylinder 14. Although only one cylinder 14 is shown, it is recognized that the number of cylinders of engine 12 could vary and that engine 12 could be a multiple cylinder engine of the in-line type, V-type, or alternatively a rotary engine. A piston 16 is positioned for reciprocal movement in cylinder 14, which cylinder 14 is in communication with an intake port 18 and an exhaust port 20, which communication is controlled by respective valves 22 and 24. Intake port 18 receives air from an air intake manifold 26 to which intake air travels after passing through, for example, an air filter (not shown). Engine 12 includes a fuel injector 28, such as an electronic unit injector, positioned for injecting liquid fuel, such as diesel fuel, into cylinder 14. The liquid fuel may be provided to fuel injector 28 by means commonly known in the art (not shown). A gaseous fuel admission valve 30 is positioned between a gaseous fuel manifold 32 at an upstream side and intake port 18 at a downstream side, a nozzle portion of valve 30 extending into intake port 18 for delivering gaseous fuel thereto. Gaseous fuel admission valve 30 may, for example, be of the type shown and described in U.S. Pat. No. 5,398,724 available from the Woodward Governor Company. Gaseous fuel manifold 32 is connected to a source of gaseous fuel 34 by fuel path 36, a solenoid operated gaseous fuel shut off valve 38 being positioned along fuel path 36. Although not shown, it is recognized that such a system might typically include a balance regulator positioned between gaseous fuel source 34 and gaseous fuel manifold 32 for regulating the gaseous fuel pressure at the upstream side of gaseous fuel admission valve 30.

Engine control system 10 includes an electronic control module (ECM) 40 which is representative of a wide variety of engine control means including processor means, such as a microcontroller or microprocessor, as well as electronic circuitry, such as input/output circuitry, and associated memory. ECM 40 is connected via conductive path 44 to a pressure sensor 42 for sensing pressure conditions in gaseous fuel manifold 32, and via conductive path 48 to a pressure sensor 46 for sensing pressure conditions in air intake manifold 26, for receiving pressure indicative signals from each of such sensors. Such pressure sensors are well known in the art and therefore a detailed description of the sensors is not included herein. A temperature sensor 43 is also provided in gaseous fuel manifold 32 to provide temperature indicative signals to ECM 40 via conductive path 45. ECM 40 is connected for controlling gaseous fuel admission valve 30 by conductive path 50 and is also connected for controlling fuel injector 28 by conductive path 52. In this regard it is know to include driver circuitry within an ECM such as ECM 40 for delivering current control signals to such devices. However, it is recognized and contemplated that such driver circuitry could be formed separate from, but connected to, ECM 40. An engine speed sensor 54 associated with a crankshaft, camshaft or other indicator of the operating speed (not shown) of engine 12 is also connected to ECM 40 via conductive path 56 for delivering engine speed indicative signals thereto. Here, for the purposes of discussion in reference to FIGS. 2 and 2a, system 10 and engine 2 are depicted for dual fuel operation, and accordingly, a mode switch 58 is connected to ECM 40 via conductive path 60 and is operable by an operator to select a liquid fuel operating mode or a dual fuel operating mode. The actual engine operating mode is determined based upon the mode switch selection and other monitored engine parameters.

ECM 40 further includes a governor 62 for processing selected of the above mentioned input signals and generating output signals for controlling a selected operating parameter or parameters of engine 12, such as engine speed, either solely or in association with operator input. Governor 62 can be operable to control the selected parameter or parameters such as engine speed in a suitable manner such as by controlling a total fuel energy rate (X); a liquid fuel energy rate (Y); and/or a gaseous fuel energy rate (Z), to be delivered to each combustion chamber of engine 12. For example, if engine 12 is to be operated in the liquid fuel mode, governor 62 is operable to generate an output signal having a value which is indicative of a liquid fuel rate (Y) necessary to maintain a desired engine speed based upon a comparison of the actual engine speed and the desired engine speed. The desired engine speed may be a predetermined engine speed stored in a suitable memory device such as internal memory 64 shown, or it may be indicated by an operator input such as a throttle setting, for example. Because engine 12 is to be operated in the liquid fuel mode, in this instance the liquid fuel energy rate (Y) is also indicative of the total fuel energy rate (X) for maintaining the desired engine speed. From the liquid fuel energy rate (Y) the duration of a fuel injector control signal for the desired engine speed can be determined. Liquid fuel is then caused to be delivered to engine 12 by delivering a control signal of the determined duration to fuel injector 28.

As another example, if engine 12 is to be operated in the dual fuel mode, governor 62 is operable to produce an output signal value indicative of a desired total fuel energy rate (X) to maintain the desired engine speed. A first value indicative of the desired liquid fuel rate (Y) and a second value indicative of the desired gaseous fuel energy rate (Z) can then be determined in a suitable manner, and a duration of a gaseous fuel admission valve control signal necessary to inject gaseous fuel in amount which provides the desired gaseous fuel energy rate (Z) can be determined and the duration of a fuel injector control signal necessary to inject liquid fuel in an amount which provides the desired liquid fuel rate (Y) can be determined. The gaseous fuel and liquid fuel are then caused to be delivered to engine 12 under control of control signals incorporating the determined durations sent to valve 30 and injector 28.

In the liquid fuel mode the liquid fuel is injected into the engine cylinders as represented by engine cylinder 14 via injector 28 and serves as the sole source of fuel energy for combustion. Here, the liquid fuel is mixed with air and is ignited by compression, for the purposes of the present invention, the means for ignition including injector 28. In the dual fuel mode the gaseous fuel is mixed with air in intake port 18 and inducted into cylinder 14, and the liquid fuel is injected into cylinder 14 where it is ignited by compression to thereby combust and ignite the mixture of air and gaseous fuel, the means for injection thus again including injector 28. Generally, in the dual fuel mode it is desirable to limit the amount of liquid fuel injected to a pilot quantity sufficient to ignite the mixture of air and gaseous fuel, so as to minimize liquid fuel costs, as well as emissions of unburned liquid fuel and pollutants from combustion of the liquid fuel.

During operation in the dual fuel mode, it is possible for a gaseous fuel admission valve, such as valve 30, associated with a combustion cylinder, such as combustion cylinder 14, to become stuck or otherwise fixed in an open position so as to allow uncontrolled flow of gaseous fuel from gaseous fuel manifold into intake port 18 for the affected cylinder. This open fault condition will result in an undesirably high amount of gaseous fuel delivery to the cylinder, which creates a deviation in the expected air to gaseous fuel ratio and will most likely cause damaging severe detonation in the combustion cylinder. The damaging detonation may limit the life of certain engine components or otherwise cause damage thereto. In order to detect an open fault condition in a gaseous fuel admission valve such as a valve stuck or fixed in an open position, a detonation sensor 66 is provided in position to detect severe detonation conditions in each combustion cylinder of engine 12. Detonation sensor 66 is connected to ECM 40 via conductive path 68 for delivering detonation indicative signals thereto. When an open fault condition in a gaseous fuel admission valve, such as valve 30, is detected, it may still be desirable to operate engine 12, but in a liquid fuel mode only.

Accordingly, referring to FIG. 2, a high level flowchart 70 of operating steps in accordance with the present invention for responding to detection of an open fault condition in a gaseous fuel admission valve of engine 12 is shown, such response enabling making a smooth transition to a liquid fuel mode with safe disposal of remaining gaseous fuel from gaseous fuel manifold 32. At a first step 72 the open fault condition is detected in a gaseous fuel admission valve of an affected combustion cylinder, identified as cylinder (n), which can be any combustion cylinder of engine 12, represented by combustion cylinder 14 in FIG. 1. As just explained, one manner of detecting an open fault condition in a gaseous fuel admission valve is via a severe detonation signal received by ECM 40 over a conductive path 68 from a detonation sensor 66, although it is likewise contemplated that an open fault condition could be detected in any other suitable manner. Once the open fault condition is detected for an affected cylinder (n), gaseous fuel shut-off valve 38 is closed, as shown at step 74. At step 76, liquid fuel delivery to affected cylinder (n) is disabled to halt combustion therein. This is preferably accomplished by disabling fuel injector 28 of affected cylinder (n) (FIG. 1). Here, it is desirable for combustion to continue in the other cylinders of the engine, that is, all cylinders but the affected cylinder. Thus, the engine operating mode is preferably switched to a liquid fuel mode such that the engine speed governing function affects liquid fuel delivery to the other cylinders only, the gaseous fuel admission valves for the other cylinders continuing to operate to exhaust the gaseous fuel supply remaining in the gaseous fuel manifold as quickly as possible. In this manner of operation, as the gaseous fuel contribution to combustion energy begins to drop, the governor will automatically increase the quantity of liquid fuel delivered to the other affected combustion cylinders in an attempt to maintain a constant engine speed. Then, when a predetermined condition is met, preferably corresponding to the pressure level in the gaseous fuel manifold being equalized to the pressure level in the air intake manifold, the gaseous fuel admission valves for the other cylinders will be closed and fuel delivery to affected cylinder (n) will be re-enabled.

This is represented by the control loop of FIG. 2 including steps 78 and 80, and subsequent steps, wherein $(Y_n)$ represents the liquid fuel energy rate delivered to affected combustion cylinder (n). As shown by step 76, when the switch to the liquid fuel operating mode is made, total energy rate (X) is set equal to liquid fuel energy rate (Y), gaseous fuel energy rate (Z) being stored in a variable $Z_o$, and liquid fuel energy rate delivered to the affected cylinder $(Y_n)$ also equalling zero. In step 78 the determination is made whether the difference between a pressure level $(P_1)$ in the gaseous fuel manifold and a pressure level $(P_2)$ in the air intake manifold is less than or equal to a predetermined value (K). If it is not, then operation of the gaseous fuel admission valves for the other cylinders is continued at the gaseous fuel energy rate $Z_o$, and the current governor output, X, is set equal set to zero to the liquid fuel energy rate Y and Y, remains. When the difference between the pressure level $(P_1)$ in the gaseous fuel manifold and the pressure level $(P_2)$ in the air intake manifold is less than or equal to the predetermined value (K), then the gaseous fuel admission valves for the other cylinders are closed, as shown by step 82. At point (A), with the gaseous fuel admission valves for the other combustion cylinders closed, the engine is operating in a solely liquid fuel mode. Here, liquid fuel delivery to affected cylinder (n) can be re-enabled. Re-enablement of liquid fuel delivery to cylinder (n) can be accomplished in any suitable manner, it being preferred to gradually increase liquid fuel delivery to affected cylinder (n) incrementally.

Figure 2A:
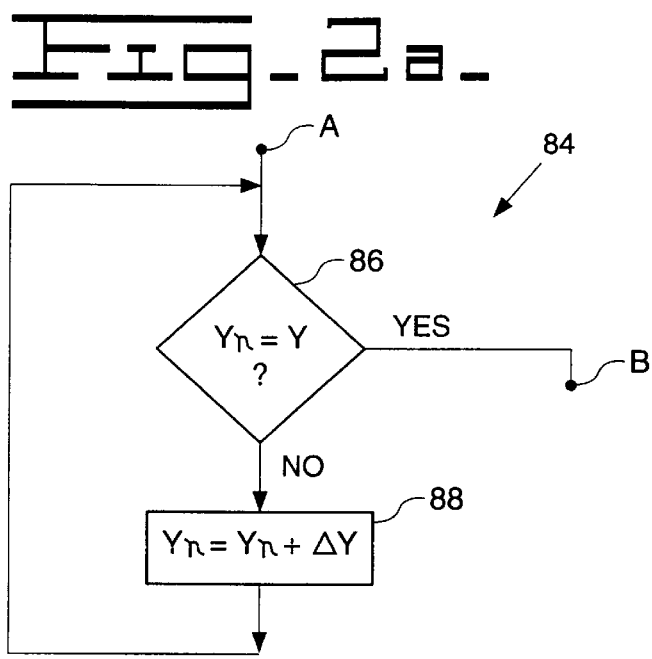
FIG. 2a is a flowchart of optional operating steps for the engine system of FIG. 1 in association with the operating steps of FIG. 2.

Referring to FIG. 2a, a method 84 commencing at point (A) in FIG. 2 for incrementally increasing fuel delivery to affected cylinder (n) according to the present invention is shown. Method 84 includes a control routine including a decision step 86 wherein it is determined whether the liquid fuel energy rate for the affected cylinder $(Y_n)$ is equal to the established liquid fuel energy rate (Y). If it is not, the liquid fuel energy rate for the affected cylinder $(Y_n)$ is increased incrementally by a predetermined amount ($\Delta Y$) as shown at step 88, until the energy rate $(Y_n)$ equals the energy rate (Y). When the energy rate $(Y_n)$ equals the energy rate (Y), operation is returned to point (B) in FIG. 2 and the transition to the liquid fuel operating mode is complete.

Here, it should be recognized and understood that engine 12 is also representative of engines operable in a gaseous fuel mode only, that is, wherein only a mixture of gaseous fuel and air provides the sole source of energy for combustion. In this alternative instance, numeral 28 in FIG. 1 represents a spark plug for igniting the gaseous fuel and air mixture in combustion cylinder 14 in the conventional manner.

Figure 3:
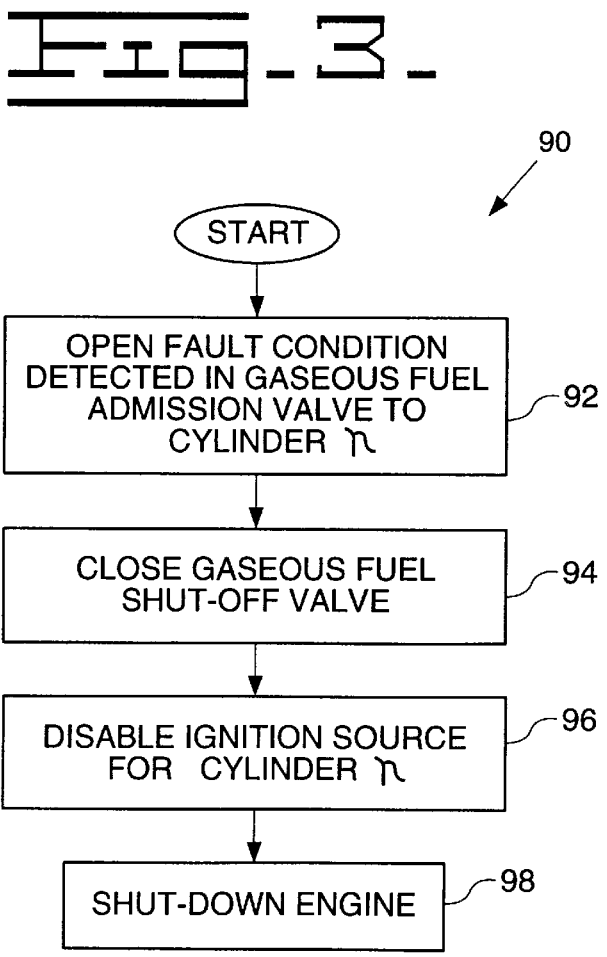
FIG. 3 is a flowchart of operating steps for the engine system of FIG. 1 in accordance with another aspect of the present invention.

Referring to FIG. 3, a method 90 is shown for responding to detection of an open fault condition in a gaseous fuel admission valve for controlling flow of gaseous fuel to an affected combustion cylinder (n) of a spark ignited engine that combusts gaseous fuel only, represented by engine 12 of FIG. 1, wherein numeral 28 represents a spark plug as just explained. Method 90 includes a first step 92 wherein an open fault condition in a gaseous fuel admission valve to an affected cylinder (n) is detected. Thereafter, the gaseous fuel shut-off valve represented by valve 38 in FIG. 1 is closed, as shown by step 94. Also, as shown by step 96, the ignition source for the affected cylinder (n) is disabled. This step can be accomplished by disabling spark plug 28 of FIG. 1. The ignition source and gaseous fuel admission valves for the other cylinders of the engine, if any, continue to operate normally such that gaseous fuel remaining in the fuel manifold is burned. Thereafter, the engine will shut down when the gaseous fuel supply within the gaseous fuel manifold is exhausted, as shown by step 98 thereby avoiding damaging severe detonation in the affected cylinder (n).

INDUSTRIAL APPLICABILITY

The present invention has utility in a wide variety of engine applications wherein gaseous fuel is utilized as either a sole source of combustion energy for the engine or is utilized in combination with other fuels such as liquid fuels. The present method, in the instance of an engine which utilizes only gaseous fuel, provides a response to an open fault condition in the gaseous fuel admission valve which enables the engine to be safely shut down. In the instance of a dual fuel engine or other engine in which gaseous fuel and another fuel, such as a liquid fuel such as diesel fuel provides the energy for combustion, the present method enables a smooth transition to an operating mode wherein the other fuels are combusted only, and wherein the gaseous fuel remaining in the gaseous fuel manifold is combusted during the transition phase. Other aspects, objects and advantages of the present invention can be obtained from a study of the drawings, the disclosure and the appended claims.

We claim:

1. A method for responding to detection of an open fault condition in a gaseous fuel admission valve for providing a flow of gaseous fuel to an affected combustion cylinder of an engine, the engine including at least one other gaseous fuel admission valve for providing a flow of gaseous fuel to at least one other combustion cylinder, a gaseous fuel shut off valve for controlling gaseous fuel flow from a source of gaseous fuel to a gaseous fuel manifold in communication with the gaseous fuel admission valves, and means for igniting a mixture of the gaseous fuel and air in each said combustion cylinder, the method comprising the steps of:

(a) closing the gaseous fuel shut off valve; and (b) disabling the means for igniting the mixture of gaseous fuel and air in the affected combustion cylinder only, while operating the at least one other gaseous fuel admission valve for allowing flow of remaining gaseous fuel in the gaseous fuel manifold through the at least one other gaseous fuel admission valve to the at least one other combustion cylinder of the engine.

2. The method, as set forth in claim 1, wherein the means for igniting the mixture of gaseous fuel and air comprise a spark plug.

3. The method, as set forth in claim 1, wherein the means for igniting the mixture of gaseous fuel and air comprise apparatus for injecting liquid fuel into the respective cylinder.

4. The method, as set forth in claim 1, where in step (b) the gaseous fuel is mixed with air and combusted in the at least one other combustion cylinder.

5. The method, as set forth in claim 4, comprising the further step of shutting down the engine after the remaining gaseous fuel in the gaseous fuel manifold has been combusted.

6. The method, as set forth in claim 1, comprising the further step of closing the at least one other gaseous fuel admission valve when a predetermined condition has been met.

7. The method, as set forth in claim 6, wherein the predetermined condition is met when the difference between a pressure level in the gaseous fuel manifold and a pressure level in an air intake manifold of the engine is less than or equal to a predetermined value.

8. The method, as set forth in claim 7, wherein the means for igniting the mixture of gaseous fuel and air in the affected combustion cylinder comprise apparatus for injecting liquid fuel into the cylinder for combustion therein and are re-enabled after the predetermined condition is met.

9. The method, as set forth in claim 8, wherein the means for igniting the mixture of gaseous fuel and air in the affected combustion cylinder are re-enabled gradually in at least one predetermined increment.

10. The method, as set forth in claim 1, wherein the open fault condition comprises a condition wherein the first named gaseous fuel admission valve is stuck in an open position.

11. The method, as set forth in claim 1, wherein the engine comprises a dual fuel engine and an engine control module, and after detection of the open fault condition the engine control module is switched to a liquid fuel mode wherein engine speed is controlled by liquid fuel injection characteristics.

12. A method for operating a dual fuel engine after identifying an open fault condition in a gaseous fuel admission valve for controlling flow of gaseous fuel from a gaseous fuel manifold into an affected air intake passage communicating with an affected combustion cylinder of the engine, the engine further including a gaseous fuel shut off valve for controlling flow of gaseous fuel from a source of gaseous fuel to the gaseous fuel manifold, an injector for injecting liquid fuel into the affected combustion cylinder, and at least one other gaseous fuel admission valve for controlling flow of gaseous fuel from the manifold to at least one other air intake passage communicating respectively with at least one other combustion cylinder, the method comprising the steps of:

(a) closing the gaseous fuel shut off valve;

(b) disabling only the injector for injecting liquid fuel into the affected combustion cylinder;

(c) operating the at least one other gaseous fuel admission valve while the injector for injecting liquid fuel into the affected combustion cylinder is disabled to allow gaseous fuel remaining in the gaseous fuel manifold to flow into the at least one other air intake passage until the difference between a pressure level in the gaseous fuel manifold and a pressure level in the air intake passage is less than or equal to a predetermined value; then, while the engine continues to operate, (d) closing the at least one other gaseous fuel admission valve; and (e) re-enabling operation of the injector for injecting liquid fuel into the affected combustion cylinder.

13. A method, as set forth in claim 12, where in step (e) the liquid fuel injection into the affected combustion cylinder occurs gradually in at least one predetermined increment.

14. The method, as set forth in claim 12, wherein the open fault condition comprises a condition wherein the first named gaseous fuel admission valve is stuck in an open position.

15. The method, as set forth in claim 12, wherein the engine comprises an engine control module, and after detection of the open fault condition the engine control module is switched to a liquid fuel mode wherein engine speed is controlled by fuel injection characteristics.

16. A method for responding to detection of an open fault condition in a gaseous fuel admission valve for controlling flow of gaseous fuel to an affected combustion cylinder of a spark ignited gaseous fuel engine having other combustion cylinders, the engine including a gaseous fuel shut-off valve positioned between a source of gaseous fuel and the gaseous fuel admission valve, the method comprising the steps of:

(a) closing the gaseous fuel shut-off valve;

(b) disabling ignition in the affected combustion cylinder while continuing ignition in the other combustion cylinders; then (c) shutting down the engine.

* * * * *